United States Patent
Cummins et al.

(10) Patent No.: US 11,419,357 B2
(45) Date of Patent: Aug. 23, 2022

(54) FOAM CONTROL

(71) Applicant: Dow Global Technologies LLC, Midland, MI (US)

(72) Inventors: Clark H. Cummins, Midland, MI (US); Stephen W. King, League City, TX (US); Xue Chen, Manvel, TX (US); Michael L. Tulchinsky, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 16/636,005

(22) PCT Filed: Feb. 12, 2019

(86) PCT No.: PCT/US2019/017653
§ 371 (c)(1),
(2) Date: Feb. 1, 2020

(87) PCT Pub. No.: WO2019/177727
PCT Pub. Date: Sep. 19, 2019

(65) Prior Publication Data
US 2021/0244060 A1 Aug. 12, 2021

Related U.S. Application Data

(60) Provisional application No. 62/644,031, filed on Mar. 16, 2018.

(51) Int. Cl.
| | | |
|---|---|---|
| *C11D 7/26* | (2006.01) | |
| *A23L 29/00* | (2016.01) | |
| *A23L 19/12* | (2016.01) | |

(52) U.S. Cl.
CPC ............. *A23L 29/035* (2016.08); *A23L 19/12* (2016.08)

(58) Field of Classification Search
CPC .............................. A23L 29/035; A23L 19/12
USPC ........................................................ 426/329
See application file for complete search history.

(56) References Cited

U.S. PATENT DOCUMENTS

| | | |
|---|---|---|
| 7,670,997 B2 | 3/2010 | Burke et al. |
| 8,829,229 B2 | 9/2014 | Briggs |
| 8,999,071 B2 | 4/2015 | Tulchinsky et al. |
| 2004/0091592 A1* | 5/2004 | Browne ............ B01D 19/0404 426/329 |

FOREIGN PATENT DOCUMENTS

| | | | |
|---|---|---|---|
| CN | 104073446 | | 10/2014 |
| JP | 05049896 A | * | 3/1993 |
| JP | 2008094881 | | 4/2008 |
| JP | 2012082357 | | 4/2012 |
| JP | 2012082357 A | * | 4/2012 |
| WO | WO-0072953 A3 | * | 3/2001 ............... A21D 2/16 |
| WO | 2019177727 | | 9/2019 |

OTHER PUBLICATIONS

Translation of JPH-05049896-A (Year: 1993).*
Translation of JP-2012082357-A (Year: 2012).*
Denkov., Mechanisms of Foam Destruction by Oil Based Anti foams. 2004, 9463-9505.
PCT/US2019/017653, International Search Report and Written Opinion dated Apr. 4, 2019.

* cited by examiner

*Primary Examiner* — Brent T O'Hern

(57) ABSTRACT

A method for controlling foam comprising providing a food composition comprising a foam control agent and a foodstuff, and processing the food composition, wherein the foodstuff comprises potato derivatives or beet derivatives. A food composition comprising a foodstuff and a foam control agent, and wherein the foodstuff comprises potato derivatives or beet derivatives.

10 Claims, No Drawings

FOAM CONTROL

BACKGROUND

The processes for manufacturing foodstuffs occasionally cause unwanted foam generation. Mechanical methods of foam management have limited effectiveness. Instead, foam control agents are added to the manufacturing process to reduce foam generation. For food and pharma applications, traditional foam control agents include ethylene oxide-based, propylene oxide-based and silicone-based agents. However, these incumbent foam control agents are becoming disfavored in the food industry. Foam-control agents that are biodegradable, and renewably sourced are desired.

SUMMARY

A method for controlling foam comprising providing a food composition comprising a foam control agent and a foodstuff, the foam control agent comprising a composition shown in Equation (1)

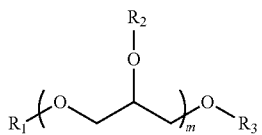

wherein each of $R_1$, $R_2$, $R_3$ are independently hydrogen, alkyl, or aryl alkyl, and m is 1 to 3; and processing the food composition, wherein the foodstuff comprises potato derivatives or beet derivatives.

A food composition comprising a foodstuff and a foam control agent, the foam control agent comprising a composition shown in Equation (1)

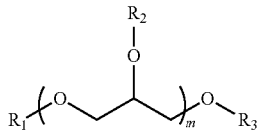

wherein each of $R_1$, $R_2$, $R_3$ are independently hydrogen, alkyl, or aryl alkyl, and m is 1 to 3; and wherein the foodstuff comprises potato derivatives or beet derivatives.

DETAILED DESCRIPTION

The present disclosure describes methods for controlling foam. The methods described herein are particularly relevant to food processing applications. During food-processing foam can be generated at various points in the production process. The foam is caused by the presence of surface-active substances such as proteins, fatty acids and sugars when aeration (generated for example by mechanical agitation, mixing, washing, extraction, stirring, sparging, etc.) occurs during processing. Foam impairs the food processing process in many different ways and greatly disrupts the process flow. The methods described herein are effective in limiting the amount of foam generated in a food processing application as compared to a similar food process where the methods described herein are not used. Without being limited by theory, it is expected that the methods of the present disclosure have features that both (1) limit the amount of foam generated in a food process (also known as anti-foam agents) and (2) minimize or eliminate generated foams (also known as defoaming agents). The food composition and the foam control agent are combined as is known in the art, for example, by mixing.

The methods described herein include providing a foam control agent to a foodstuff. The foam control agent comprises the composition shown in Equation (1):

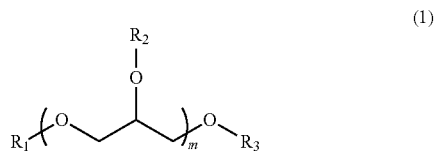

wherein each of $R_1$, $R_2$, $R_3$ are independently hydrogen, alkyl, or aryl alkyl, and
m is 1 to 3;

The compositions of Equation (1) are (poly)glycerol ethers. The (poly)glycerol ethers may be linear, branched, cycloaliaphatic or arylalkyl. The monoalkyl (poly)glycerol ethers are prepared by the reaction of an aldehyde with (poly)glycerol in the presence of hydrogen and a catalyst. The general method is known in the literature and is called "catalytic reductive etherification" and specific instances of this reaction are described in the Examples and further details are available in U.S. Pat. Nos. 8,829,229 and 8,999,071, which are incorporated herein by reference. The term "(poly)glycerol" means that the compound either includes a repeating unit, or does not include a repeating unit; where m is 1, there is no repeating unit, where m is 2 or 3, the portion of the compound shown in parentheses in Equation (1) repeats the given number of times. The alkyl in Equation (1) is linear, branched, cyclic or a combination thereof. The alkyl and the aryl alkyl are each independently $C_1$ to $C_{30}$. The composition of Equation (1) has a total amount of carbon atoms from $C_6$ to $C_{159}$.

The foam control agent optionally further includes a solvent, a surfactant, an emulsifier, or a combination thereof. The foam control agent contains from 0.5 to 100 percent, by weight, of the compositon of Equation (1). Alternatively, the foam control agent contains from 5 to 100 percent, by weight, of the compositon of Equation (1). Alternatively, the foam control agent contains from 10 to 100 percent, by weight, of the compositon of Equation (1). Alternatively, the foam control agent contains from 15 to 100 percent, by weight, of the compositon of Equation (1). Alternatively, the foam control agent contains from 20 to 100 percent, by weight, of the compositon of Equation (1). Alternatively, the foam control agent contains from 25 to 100 percent, by weight, of the compositon of Equation (1). Alternatively, the foam control agent contains from 30 to 100 percent, by weight, of the compositon of Equation (1).

The optional solvent contained in the foam control agent is selected to be suitable for dissolving or dispersing the composition of Equation (1). Such solvents include hydrocarbons (both aromatic and aliphatic), and oxygenated solvents (alcohols, ketones, aldehydes,ethers, glycol ethers, esters, and glycol ether esters).

The optional surfactant or emulsifier contained in the foam control agent is selected to be suitable for improving the wettability of the foam control agent on the foodstuff, or forming an emulsion with the composition of Equation (1).

The optional surfactant or emulsifier has an amount ranging from 0.1-30% by weight of the composition of Equation (1).

The optional surfactant or emulsifier may be anionic, cationic or nonioic. Examples of suitable anionic surfactants or emulsifiers are alkali metal, ammonium and amine soaps; the fatty acid part of such soaps contains preferably at least 16 carbon atoms. The soaps can also be formed "in situ;" in other words, a fatty acid can be added to the oil phase and an alkaline material to the aqueous phase.

Other examples of suitable anionic surfactants or emulsifiers are alkali metal salts of alkyl-aryl sulfonic acids, sodium dialkyl sulfosuccinate, sulfated or sulfonated oils, e.g., sulfated castor oil; sulfonated tallow, and alkali salts of short chain petroleum sulfonic acids.

Suitable cationic surfactants or emulsifiers are salts of long chain primary, secondary or tertiary amines, such as oleylamide acetate, cetylamine acetate, di-dodecylamine lactate, the acetate of aminoethyl-aminoethyl stearamide, dilauroyl triethylene tetramine diacetate, 1-aminoethyl-2-heptadecenyl imidazoline acetate; and quaternary salts, such as cetylpyridinium bromide, hexadecyl ethyl morpholinium chloride, and diethyl di-dodecyl ammonium chloride.

Examples of suitable nonionic surfactants or emulsifiers are condensation products of higher fatty alcohols with ethylene oxide, such as the reaction product of oleyl alcohol with 10 ethylene oxide units; condensation products of alkylphenols with ethylene oxide, such as the reaction product of isoctylphenol with 12 ethylene oxide units; condensation products of higher fatty acid amides with 5, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethyleneglycol monobehenate, tricosaethyleneglycol dibehenate, polyhydric alcohol partial higher fatty acid esters such as sorbitan tristearate, ethylene oxide condensation products of polyhydric alcohol partial higher fatty acid esters, and their inner anhydrides (mannitol-anhydride, called Mannitan, and sorbitol-anhydride, called Sorbitan), such as glycerol monopalmitate reacted with 10 molecules of ethylene oxide, pentaerythritol monooleate reacted with 12 molecules of ethylene oxide, sorbitan monostearate reacted with 10-15 molecules of ethylene oxide, mannitan monopalmitate reacted with 10-15 molecules of ethylene oxide; long chain polyglycols in which one hydroxyl group is esterified with a higher fatty acid and other hydroxyl group is etherified with a low molecular alcohol, such as methoxypolyethylene glycol 550 monostearate (550 meaning the average molecular weight of the polyglycol ether). A combination of two or more of these surfactants may be used; e.g., a cationic may be blended with a nonionic or an anionic with a nonionic.

The foam control agent may further comprise one or more additives. Examples of additives include ethylene oxide/propylene oxide block copolymers, butylene oxide/propylene oxide block copolymers, ethylene oxide/butylene oxide block copolymers, waxes, or silicone-based materials.

The "food composition" described herein is a combination of the foam control agent and the foodstuff. The foodstuff is either a potato derivative or a beet derivative, or combinations thereof. As used herein, derivative means that the foodstuff is processed. Examples of such processes include, washing, slicing, fermenting, grating, crushing, peeling, and mixing. The beet derivative is preferably a sugarbeet derivative. The foodstuff may be pre-processed according to one or more processing steps prior to addition of the foam control agent. Alternatively, the foodstuff may be washed between processing steps, whereby a foam control agent is added separately during one or more of the processing steps.

The foam control agent is added to the foodstuff in sufficient quantity to achieve the level of foam control necessary for the process. It is recognized that different food processing techniques result in varying levels of foam generation, and as such, require varying amounts of foam control agent to achieve the desired result. The amount of foam control agent added to the food stuff is measured as a percentage of the combined weight of the foam control agent and the foodstuff (total weight of the food composition), where the quantity of the foam control agent is from 0.01 to 5 percent, by weight, of the total weight of the food compostion, preferably, 0.1 to 1 percent, by weight, of the total weight of the food composition.

EXAMPLES

Example 1

3-(2-ethylhexyloxy)-1,2-propanediol

2-Ethylhexanal (128.2 g, 1 mol), glycerol (920.9 g, 10 mol), and 5% Pd/C catalyst (5 wt % relative to the aldehyde, 6.41 g) (each of which were purchased from Sigma-Aldrich) were loaded under nitrogen into a 2 L Parr reactor. The reactor was sealed and purged with hydrogen three times at about 100 psi with stirring. Then hydrogen (100 psi) was charged, the reactor was quickly heated to 200° C. with stirring, and hydrogen pressure was set at 500 psi. The reaction was carried out for 14 hours at 200° C. and 500 psi of hydrogen.

The catalyst was filtered off and washed with methanol, the solvent was evaporated in vacuum. The upper (product) phase was separated and the lower (glycerol) phase was extracted with toluene (300 mL×6). Toluene was evaporated and the residue was combined with the product phase to give the crude product (178.4 g), a part of which (128.4 g) was fractionally distilled in vacuum to give 103.7 g (71%) of 3-(2-ethylhexyloxy)-1,2-propanediol (major) and 2-(2-ethylhexyloxy)-1,3-propanediol (minor), b.p. 82-84° C./0.06 mm Hg.

Example 2

3-[3-(2-ethylhexyloxy)-2-hydroxypropoxy)]-1,2-propanediol

Diglycerin (33.23 g, 0.2 mol, purchased from TCI America) and 5% Pd/C catalyst (0.115 g, purchased from Sigma-Aldrich) were charged to a 150 mL Parr reactor and purged with hydrogen at 100 psi three times. Then distilled 2-ethylhexanal (2.56 g, 0.02 mol, purchased from Sigma-Aldrich) was charged by syringe, and the mixture was again purged with hydrogen (~100 psi) two times. Hydrogen (500 psi) was charged, the mixture was quickly heated to 200° C. with stirring, and run at 1000 psi for 16 hours. The product was then filtered and extracted with ether (25 mL×10). Ether was evaporated at reduced pressure, and the residue was distilled in vacuum to give the product (3.49 g, 66%), b.p. 193-201° C./0.04 mm Hg.

Example 3

3-hexyloxy-1,2-propanediol

Hexanal (100.2 g, 1 mol), glycerol (920.9 g, 10 mol), and 5% Pd/C catalyst (5 wt % relative to the aldehyde, 5.01 g) (all purchased from Sigma-Aldrich) were loaded under nitrogen into a 2 L Parr reactor. The reactor was sealed and purged with hydrogen three times at about 100 psi with stirring. Then hydrogen (100 psi) was charged, the reactor was quickly heated to 200° C. with stirring, and hydrogen pressure was set at 300 psi. The reaction was carried out for 10 hrs at 200° C. and 300 psi of hydrogen. The catalyst was filtered off and washed with methanol, then the solvent was evaporated in vacuum. The mixture was extracted with toluene (200 mL×10), the combined toluene was evaporated, and the residue fractionally distilled in vacuum, giving 123.6 g of 3-hexyloxy-1,2-propanediol (major) and 2-hexyloxy-1,3-propanediol (minor) at 78-81° C./0.04 mm, which also contained 1,3-bis(hexyloxy)-2-propanol and 1,2-bis(hexyloxy)-3-propanol. A portion of this product (115.0 g) was dissolved in a mixture of acetonitrile (400 mL) and water (10 mL) and extracted with heptane (100 mL×5) to remove dihexyl glycerol impurities. Then acetonitrile and water were evaporated in vacuum to give 99.5 g (61%) of the pure product.

Example 4

3-[2-hydroxy-3-(2-propylheptyloxy)propoxy]-1,2-propanediol

Diglycerin (166.15 g, 1.00 mol, purchased from TCI America) and 5% Pd/C (1.23 g, purchased from Sigma-Aldrich) were charged to a 250 ml Parr reactor and purged three times with hydrogen with stirring. Then 2-propylhept-2-enal, obtained by condensation of valeraldehyde, (24.68 g, 0.16 mol, purchased from Sigma-Aldrich) was introduced by syringe and the mixture was purged with hydrogen two more times. Hydrogen (200 psi) was charged, the reactor was quickly heated to 200° C. with stirring, and run at 500 psi for 20 h. The reaction mixture was filtered, the reactor washed with methanol (50 ml×2), the solution was concentrated and combined with the main portion. The upper phase containing the crude product (25.9 g) was separated. The diglycerol (lower) phase was extracted with toluene (100 mL×8) and then toluene was removed in vacuum to give additionally 11.5 g of the extracted product, which was combined with the main portion. The crude material was used for evaluation.

Example 5

1,3-bis(2-phenylethyloxy)-2-propanol

A 250 mL, three-necked, round-bottom flask, fitted with an addition funnel, magnetic stirrer, and an internal thermometer, was charged with 2-phenylethanol (48.9 g; 0.4 mol) and epichlorohydrin (0.1 mol; 9.25 g; 7.8 mL) (each purchased from Sigma-Aldrich). The reaction mixture was heated to 60° C. with vigorous stirring. Sodium hydroxide (0.1 mol; 4.0 g) as a 50% (w/w) solution in water (4.0 g) was added dropwise over a period of 15 min. The reaction was exothermic, and the temperature was maintained at 70-90° C. for 1 hr. A white precipitate formed soon after the addition started. GC analysis of the reaction mixture showed nearly complete consumption of epichlorohydrin and formation of a new peak. Then, additional sodium hydroxide (0.1 mol; 4.0 g) as a 50% (w/w) solution in water was added in one aliquot. The system was stirred at 80-85° C. for 2 hrs. GC analysis showed another major new peak while the intermediate completely disappeared. The reaction mixture was neutralized by the addition of concentrated (37%) HCl (8-9 mL). An abundant white precipitate was observed. The final pH was slightly acidic (if basic, it should be adjusted to acidic/neutral). The upper layer was carefully decanted from separated water and NaCl and dried over sodium sulfate. The initially hazy material became clear after drying overnight. The liquid was filtered, then the alcohol was removed under vacuum at 55° C./0.7 mm Hg to give a crude product (~24 g). Purification of 5 g of the crude material was performed by ISCO chromatography on silica gel with hexane-ethyl acetate from 7:1 to neat ethyl acetate to give 2.7 g of the pure material which was characterized by $^1$H and $^{13}$C NMR and accurate mass GC-MS.

Example 6

1,3-Bis(2-cyclohexylethoxy)-2-propanol

The 1,3-Bis(2-phenylethyloxy)-2-propanol (2.07 g) prepared according to Example 5 was dissolved in 20 mL of heptane (purchased from Fisher Scientific) and charged together with 5% Rh/C (0.5 g, purchased from Strem) to a 160 mL Parr reactor. The reactor was sealed and purged with house nitrogen (50 psig) two times. Then the compound was hydrogenated at 500 psi of hydrogen and 120° C. for 6 h. NMR analysis revealed that the reduction was >99% completed. The mixture was filtered and solvent evaporated to give 2.00 g of the residue which was characterized by $^1$H and $^{13}$C NMR and accurate mass GC-MS.

Example 7

C 18 Glycerol Ether (Solid)

Benzaldehyde (100 g; 0.942 mol) and glycerol (83 g; 0.901 mol) were mixed together with p-toluene-sulfonic acid (1 g) in toluene (250 ml) (each available from Sigma Aldrich). The mixture was refluxed for 8 hrs using a Dean-Stark trap. At the end of reaction the volume of formed water was constant. The toluene solution was washed with saturated sodium carbonate in water (100 ml×2), water (100 ml) and dried over sodium sulfate. This solution was mixed with hexane (1:1) and crystallized in the refrigerator to give 49 g of cis-5-hydroxy-2-phenyl-1,3-dioxane with GC purity of 97%. The remaining mother liquor was crystallized similarly. The solvent in the mixture was decanted and the solids placed on a high-vacuum rotary evaporator (without heat) to remove any remaining traces of solvent. The solids were dissolved in toluene, and hexane was added until the solution became cloudy at a ratio of approximately 2:3. The flask was sealed and placed in the freezer at (−20° C.) for 2 hours. The white, fibrous solids were collected by filtration and vacuum dried for an additional 9.1 g of cis-5-hydroxy-2-phenyl-1,3-dioxane with GC purity of 97% and a combined yield of 36%.

5-Hydroxy-2-phenyl-1,3-dioxane (5.4 g; 30 mmol) and powdered potassium hydroxide (10 g; 179 mmol) in toluene (120 mL) were refluxed with a Dean-Stark head for 30 min. Then 1-bromooctadecane (10.0 g; 30 mmol, purchased from Sigma-Aldrich) in toluene (50 mL) was added dropwise within 30 min. The mixture was refluxed for 3 hrs and then analyzed by GC to verify complete consumption of the alkyl bromide. The toluene solution was extracted with water (3×75 mL) and dried over sodium sulfite. GC/MS analysis revealed the presence of 1-octadecene (26%) and 2-O-octadecyl-1,3-benzylidene glycerol (63%). Toluene was removed in a rotary evaporator at 40° C. to give 12.8 g of the crude brown material, which was crystallized from hexane (100 mL) in the freezer at −20° C. 2-O-octadecyl-1,3-benzylideneglycerol (7.77 g, yield 60%) was collected initially and from subsequent crystallizations of the mother liquors. The product structure and purity was supported by NMR and accurate mass GC/MS.

The above purified glycerol ether was dissolved in ethanol to prepare a 10 wt % solution to use in the performance test.

Example 8

C 22 Glycerol Ether (Solid)

Potassium hydroxide (4.7 g, 83 mmol) was ground to a fine powder with a mortar and pestle before charging to a 200 mL Schlenk flask equipped with a stir bar and septum. Toluene (50 mL) was added to form white slurry. Addition of 1-bromoeicosane (10.1 g, 28 mmol, purchased from Sigma-Aldrich) was done by syringe. A Dean-Stark apparatus with a cold water condenser was attached to the reaction vessel and the reaction was heated to reflux. 5-Hydroxy-2-phenyl-1,3-dioxane (5.04 g, 28 mmol) prepared in the Example 7 was dissolved in 20 mL toluene, charged to a 20 mL syringe with an attached cannula and loaded into a syringe pump. The dioxane solution was added dropwise over 30 minutes. The reaction turned dark brown as it refluxed for 100 h to achieve full conversion. The reaction was cooled to room temperature and slowly poured into stirring water (200 mL) then transferred to a separatory funnel. The water layer was removed and the organic layer was washed with water (3×100 mL). After removal of the final wash the organic layer was dried over $MgSO_4$, filtered and concentrated on a rotary evaporator to a viscous, yellow residue. The residue was dissolved in hexane (50 mL) and placed in the freezer (−20° C.) for 2 hours. The pale yellow solids were placed under high vacuum to yield 9.1 g (~70%) of the white product. The product structure and purity was supported by NMR and accurate mass GC/MS. The above purified glycerol ether was dissolved in ethanol to prepare a 10 wt % solution to use in the performance test Potatoes were washed in water, peeled and sliced. 780 g of sliced potatoes and 520 g of deionized (DI) water were added to a kitchen food processor and processed for 1 minute. A potato slurry was generated, which was filtered through filter paper and the liquid was used to evaluate the foam control agents. This liquid is referred to as potato liquor.

Similarly, sugar beets were washed in water, peeled and sliced. 780 g of sliced sugar beets and 520 g of DI water were added to a food processor and processed for 1 minute. A sugar beet slurry was generated, which was filtered through filter paper and the liquid was used to evaluate the foam control agents. This liquid is referred to as sugar beet liquor.

For each of the products described in the Examples, two samples were prepared. The first sample contained 0.5 g of the product described in the respective Example and 99.5 g of potato liquor to give 100 g of material for evaluation. The second sample contained 0.5 g of the product described in the respective Example and 99.5 g of beet liquor to give 100 g of material for evaluation. Two control samples were prepared. The first sample contained 100 g of potato liquor without any (poly)glycerol ether. The second sample contained 100 g of beet liquor without any (poly)glycerol ether.

A sparge tube test was utilized to evaluate the performance of the foam control agents. The description of this testing procedure is known in the literature and is incorporated here by reference: N. D. Denkov, "Mechanisms of Foam Destruction by Oil-Based Antifoams," *Langmuir* 2004, 20 (22), 9463-9505. The "foam control efficiency" of a material was evaluated by measuring its effect on the foam height. 100 g of each liquid sample described above was added separately into a 1000 mL glass cylinder with a diameter of 5 cm. A vertical gas sparging tube fitted with a sintered glass frit was placed at the cylinder bottom and air was bubbled from the bottom of the cylinder. Air flow was controlled by an Ametek Lo-Flo 0-10 Float Meter with the setting at 1. Foam heights were recorded during the first 10 minutes after air flow was applied. If a foam height reached 1000 mL within the first 10 minutes, the experiment was stopped.

Tables 1 and 2 are foam volumes of sugar beet liquor and potato liquor, respectively, as a function of time, for the Examples, and Control samples. The unit of numerical value of foam volume is mL. As shown in the tables, for both potato liquor and sugar beet liquor, the presence of the (poly)glycerol ethers resulted in foam levels which were much lower than the control examples without (poly)glycerol ethers, where foam volumes reached at least 1000 mL within 2 minutes.

TABLE 1

Foam volume (mL) increase as a function of time for sugar beet liquor

| Example | 0.5 min | 1 min | 2 min | 3 min | 4 min | 5 min | 6 min | 7 min | 8 min | 9 min | 10 min |
|---|---|---|---|---|---|---|---|---|---|---|---|
| Control | 480 | 600 | >1000 | >1000 | >1000 | >1000 | >1000 | >1000 | >1000 | >1000 | >1000 |
| 1 | 200 | 230 | 250 | 250 | 250 | 250 | 250 | 250 | 250 | 250 | 250 |
| 2 | 160 | 200 | 230 | 250 | 250 | 250 | 250 | 250 | 250 | 250 | 250 |
| 3 | 140 | 160 | 250 | 280 | 300 | 300 | 300 | 250 | 200 | 250 | 200 |
| 4 | 130 | 170 | 290 | 380 | 400 | 400 | 400 | 380 | 400 | 400 | 400 |
| 5 | 70 | 90 | 100 | 100 | 100 | 100 | 100 | 100 | 100 | 100 | 100 |
| 6 | 210 | 240 | 350 | 410 | 470 | 530 | 570 | 590 | 630 | 660 | 660 |
| 7 | 70 | 100 | 170 | 230 | 280 | 350 | 410 | 410 | 430 | 410 | 410 |
| 8 | 60 | 90 | 140 | 170 | 240 | 300 | 390 | 460 | 530 | 560 | 570 |

TABLE 2

| Foam volume (mL) increase as a function of time for potato liquor | | | | | | | | | | | |
|---|---|---|---|---|---|---|---|---|---|---|---|
| Example | 0.5 min | 1 min | 2 min | 3 min | 4 min | 5 min | 6 min | 7 min | 8 min | 9 min | 10 min |
| Control | 320 | 600 | >1000 | >1000 | >1000 | >1000 | >1000 | >1000 | >1000 | >1000 | >1000 |
| 1 | 150 | 200 | 250 | 250 | 250 | 250 | 250 | 250 | 230 | 230 | 230 |
| 2 | 180 | 300 | 310 | 320 | 320 | 350 | 350 | 350 | 380 | 380 | 380 |
| 4 | 30 | 30 | 30 | 30 | 30 | 30 | 30 | 30 | 30 | 30 | 30 |
| 6 | 205 | 235 | 455 | 645 | 665 | 695 | 695 | 695 | 675 | 675 | 675 |
| 7 | 50 | 60 | 90 | 120 | 160 | 170 | 170 | 190 | 200 | 200 | 200 |
| 8 | 70 | 90 | 160 | 220 | 300 | 360 | 420 | 490 | 530 | 550 | 550 |

What is claimed is:

1. A method for controlling foam comprising:
providing a food composition comprising a foam control agent and a foodstuff, the foam control agent comprising a composition shown in Equation (1)

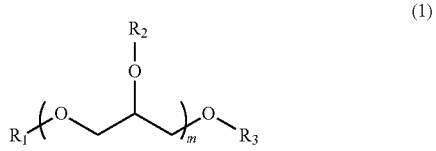
(1)

wherein each of $R_1$, $R_2$, $R_3$ are independently hydrogen, alkyl, or aryl alkyl, and m is 1 to 3;
processing the food composition, wherein the foodstuff comprises potato derivatives or beet derivatives.

2. The method of claim 1, wherein the alkyl and the arylalkyl are each $C_1$ to $C_{30}$.

3. The method of claim 1, wherein the alkyl is linear, branched, cyclic, or a combination thereof.

4. The method of claim 1, wherein the foam control agent contains 0.5 to 100 percent, by weight, of the composition shown in Equation (1).

5. The method of claim 1, wherein the foam control agent contains 30 to 100 percent, by weight, of the composition shown in Equation (1).

6. The method of claim 1, wherein the quantity of the foam control agent in the food composition is 0.01 to 5 percent, by weight.

7. The method of claim 1, wherein the quantity of the foam control agent in the food composition is 0.1 to 1 percent, by weight.

8. The method of claim 1, wherein the foam control agent further comprises a solvent.

9. The method of claim 1, wherein the step of processing the food composition comprises one or more of washing, slicing, fermenting, grating, crushing, peeling, or mixing.

10. The method of claim 1, wherein the foam control agent further comprises an additive comprising an ethylene oxide/propylene oxide block copolymer, butylene oxide/propylene oxide block copolymer, ethylene oxide/butylene oxide block copolymer, a wax, or a silicone-based material.

* * * * *